(12) United States Patent
Harris et al.

(10) Patent No.: US 9,737,104 B1
(45) Date of Patent: Aug. 22, 2017

(54) MOTORCYCLE HELMET CAMERA MOUNT

(71) Applicants: Karen Harris, Eastover, NC (US); Terry Harris, Eastover, NC (US)

(72) Inventors: Karen Harris, Eastover, NC (US); Terry Harris, Eastover, NC (US)

(*) Notice: Subject to any disclaimer, the term of this patent is extended or adjusted under 35 U.S.C. 154(b) by 346 days.

(21) Appl. No.: 14/618,047

(22) Filed: Feb. 10, 2015

(51) Int. Cl.
A42B 3/04 (2006.01)
G03B 17/56 (2006.01)

(52) U.S. Cl.
CPC ............ *A42B 3/0406* (2013.01); *A42B 3/042* (2013.01); *G03B 17/561* (2013.01)

(58) Field of Classification Search
CPC ....... A42B 3/0406; A42B 3/042; A42B 3/044; F16M 13/04; G03B 17/561
USPC ................. 2/422; 396/428; 224/181
See application file for complete search history.

(56) References Cited

U.S. PATENT DOCUMENTS

| 2,651,981 | A | * | 9/1953 | Calhoun | F16M 13/04 |
| | | | | | 206/820 |
| 2,952,200 | A | * | 9/1960 | Welch | F16M 13/04 |
| | | | | | 224/623 |
| 6,028,627 | A | * | 2/2000 | Helmsderfer | A42B 3/042 |
| | | | | | 345/8 |
| 6,098,627 | A | * | 8/2000 | Kellner | A61O 5/90 |
| | | | | | 128/859 |
| 6,819,354 | B1 | | 11/2004 | Foster | |
| 7,369,174 | B2 | | 5/2008 | Olita | |
| 7,570,301 | B2 | * | 8/2009 | Gilor | A42B 3/04 |
| | | | | | 348/373 |
| 7,805,776 | B2 | * | 10/2010 | Crossman | A42B 3/044 |
| | | | | | 2/410 |
| 7,849,517 | B2 | * | 12/2010 | Rogers | A42B 3/04 |
| | | | | | 2/422 |
| 7,905,620 | B2 | | 3/2011 | Harris | |
| D680,147 | S | * | 4/2013 | Konishi | D16/208 |
| D700,746 | S | * | 3/2014 | Capozzi | D29/103 |
| D736,296 | S | * | 8/2015 | Musec | D16/208 |
| 9,197,793 | B2 | * | 11/2015 | Blackman | H04N 5/2251 |
| D750,847 | S | * | 3/2016 | Noordzij | D29/122 |
| 9,395,603 | B2 | * | 7/2016 | Achenbach | G03B 17/561 |
| 9,572,388 | B2 | * | 2/2017 | Carroll | A42B 3/0406 |
| 2005/0200750 | A1 | | 9/2005 | Ollila | |
| 2010/0128468 | A1 | * | 5/2010 | Ong | B60Q 1/2676 |
| | | | | | 362/106 |
| 2010/0175172 | A1 | * | 7/2010 | Dempsey | G02B 23/125 |
| | | | | | 2/422 |
| 2015/0282548 | A1 | * | 10/2015 | Tulley | A42B 3/042 |
| | | | | | 2/422 |
| 2016/0045018 | A1 | * | 2/2016 | Keune | A42B 1/245 |
| | | | | | 224/181 |

FOREIGN PATENT DOCUMENTS

DE 102011118982 A1 5/2013
DE 102013019775 A1 * 5/2015 ............. A42B 3/042

* cited by examiner

*Primary Examiner* — Justin Larson
(74) *Attorney, Agent, or Firm* — Kyle A. Fletcher, Esq.

(57) ABSTRACT

The motorcycle helmet with camera mount is designed to mount a camera next to the chin of the user, and upon a helmet. The motorcycle helmet with camera mount comprises a base, a left wing, a right wing, and a plurality of adhesives.

10 Claims, 4 Drawing Sheets

MOTORCYCLE HELMET CAMERA MOUNT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of safety devices and helmets, more specifically, a camera mount accessory configured for use with motorcycle helmets.

There has been a trend towards mounting cameras on helmets, including motorcycle helmets, over the last few years. Traditionally, cameras are mounted on the top of the helmet but cameras mounted in this way have several disadvantages. First, it is difficult for the user to see and operate a camera mounted on the top of a helmet. Second, a camera mounted on the top of a helmet is more prone to being damaged or having the view inadvertently blocked compared to cameras mounted in other locations. Third, cameras mounted on the top of helmets make putting on goggles or other equipment more difficult. Fourth, the helmet is often in the picture. Finally, when the camera records sounds the camera will pick up a lot of wind noise.

SUMMARY OF INVENTION

The current disclosure addresses these issues by disclosing a camera mount that is designed to mount a camera next to the chin of the user. Mounting the camera in this position has several advantages including, but not limited to: 1) the user is able to see and monitor the camera during operation; 2) the camera is in a more protected position and is less exposed to potential damage; 3) the camera is out of the way of the goggles; 4) the camera is out in front of the motorcycle helmet which will not be in the picture; and 5) the camera is protected by the body of the user and is less prone to pick up the sounds of passing air.

The motorcycle helmet with camera mount comprises a base, a left wing, a right wing, and a plurality of adhesives.

These together with additional objects, features and advantages of the motorcycle helmet with camera mount will be readily apparent to those of ordinary skill in the art upon reading the following detailed description of the presently preferred, but nonetheless illustrative, embodiments when taken in conjunction with the accompanying drawings.

In this respect, before explaining the current embodiments of the motorcycle helmet with camera mount in detail, it is to be understood that the motorcycle helmet with camera mount is not limited in its applications to the details of contruction and arrangements of the components set forth in the following description or illustration. Those skilled in the art will appreciate that the concept of this disclosure may be readily utilized as a basis for the design of other structures, methods, and systems for carrying out the several purposes of the motorcycle helmet with camera mount.

It is therefore important that the claims be regarded as including such equivalent construction insofar as they do not depart from the spirit and scope of the motorcycle helmet with camera mount. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
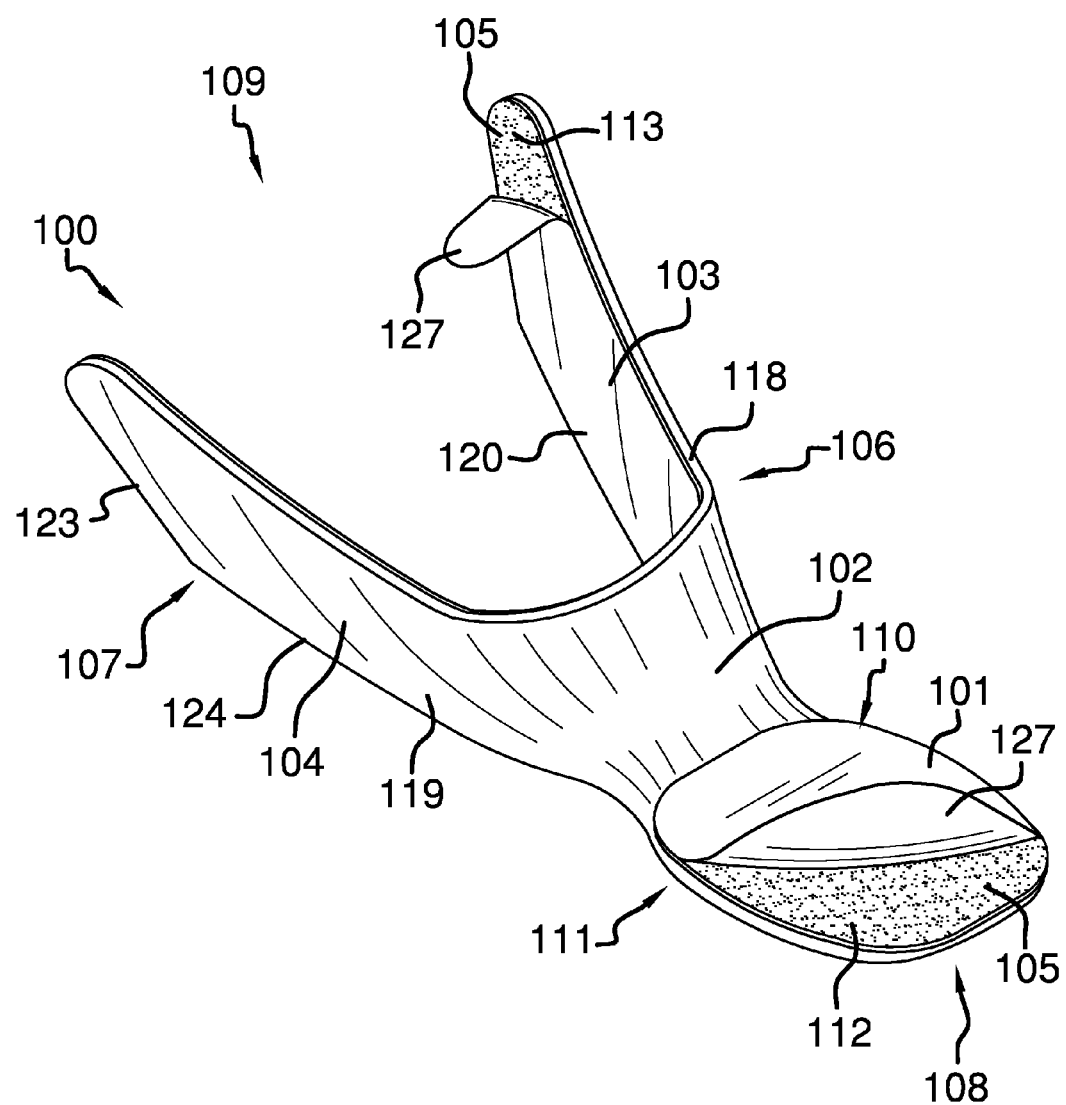
FIG. 1 is a perspective view of an embodiment of the disclosure.
Figure 2:
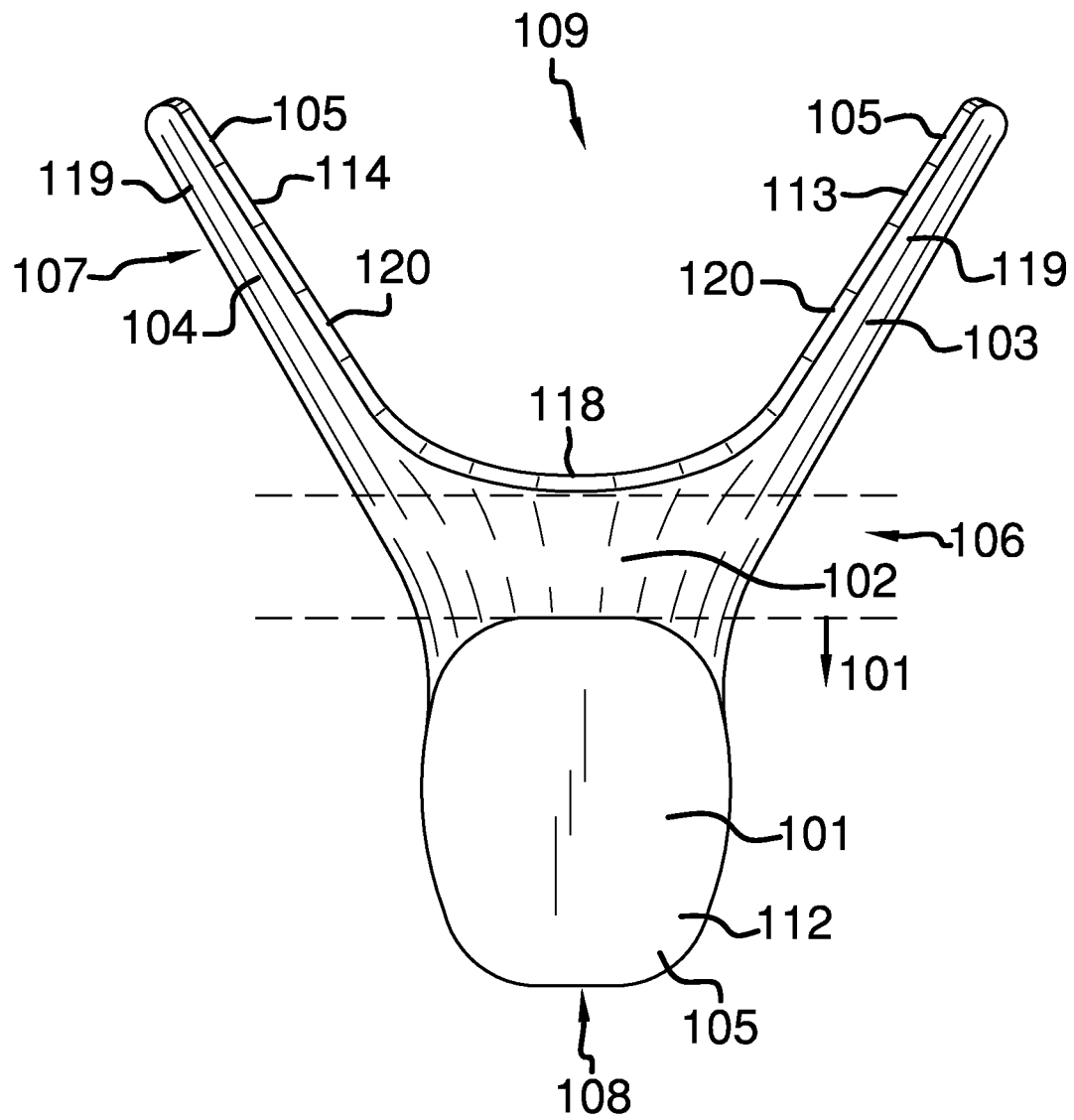
FIG. 2 is a top view of an embodiment of the disclosure.
Figure 3:
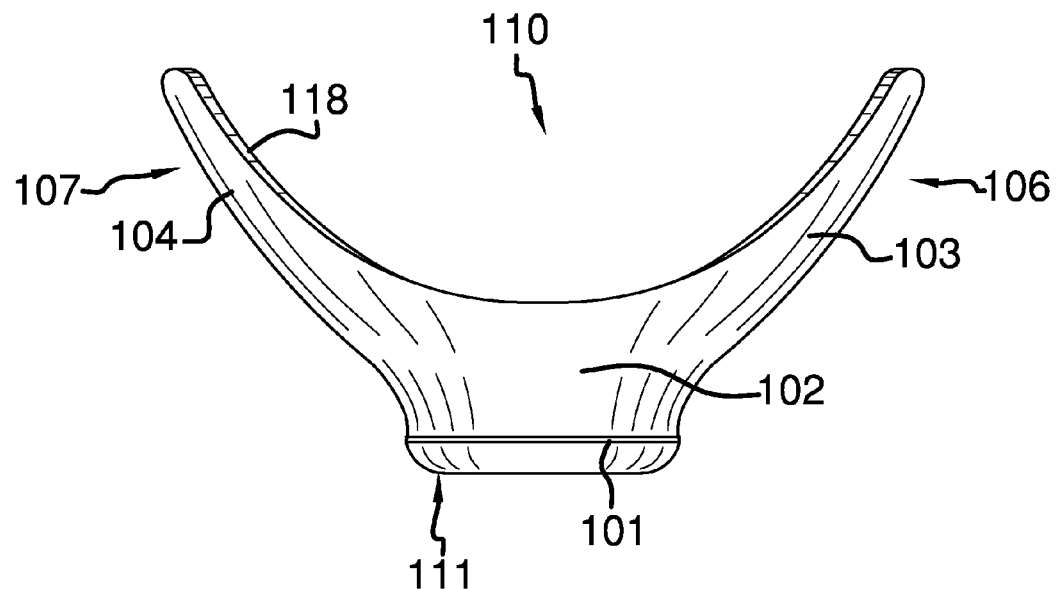
FIG. 3 is a front view of an embodiment of the disclosure.
Figure 4:
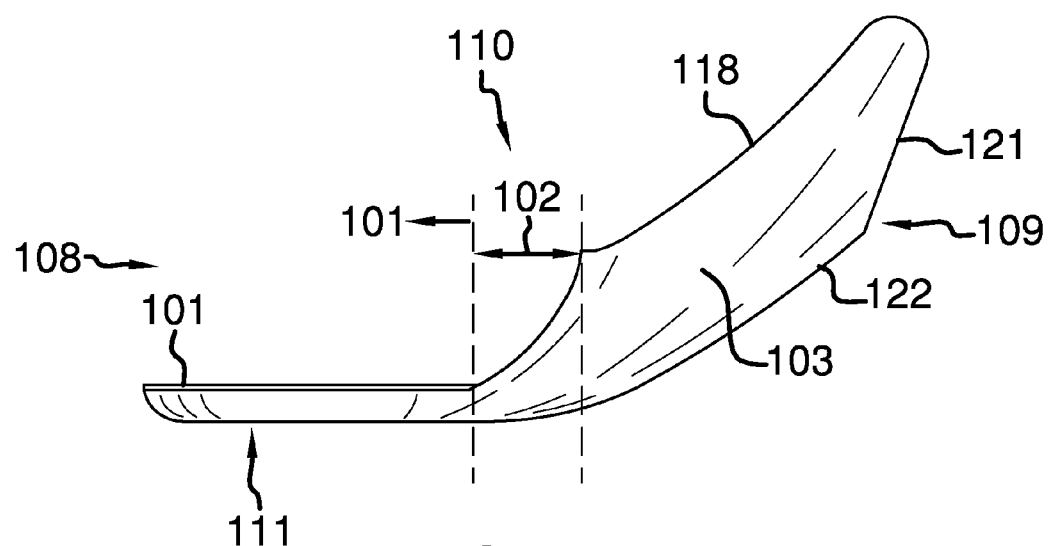
FIG. 4 is a side view of an embodiment of the disclosure.
Figure 5:
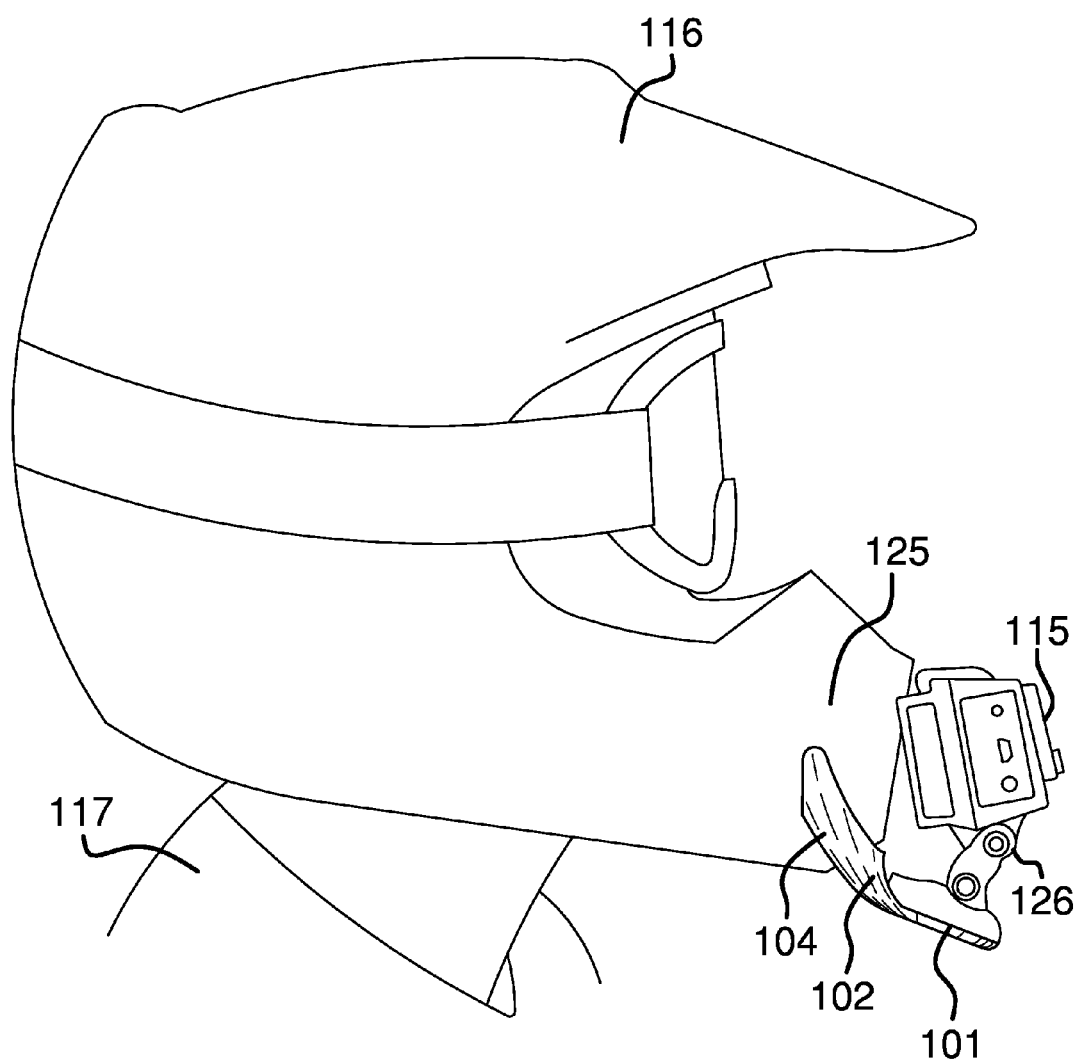
FIG. 5 is an in-use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5. The motorcycle helmet with camera mount 100 (hereinafter invention) comprises a base 101, a tongue 102, a left wing 103, a right wing 104, and a plurality of adhesives 105.

The base 101, the tongue 102, the left wing 103, and the right wing 104 are formed as a single unit. The base 101 is a flat plate that can be in the shape of a rectangle, oval or disc. The base 101 is located in a lower 111 and front 108 portion of the invention 100.

Projecting out from a back 109 of the base 101 is the tongue 102. The tongue 102 is a curved structure with a convex upper 110 surface. As the tongue 102 projects away from the back 109 of the base 101, the span from a left 106 side of the tongue 102 to a right 107 side of the tongue 102 shall increase. The convex upper 110 surface of the tongue 102 rises above the upper 110 surface of the base 101. The tongue 102 projects away from the back 109 of the base 101 to the upper rim 118, and the convex upper 110 surface of the tongue 102 rises above the upper 110 surface of the base 101 to the upper rim 118, which is the back 109 boundary of the tongue 102.

As the convex upper 110 surface of the tongue 102 rises above the base 101, the left 106 surface and the right 107 surface are formed, and which are called the left wing 103 and right wing 104, respectively.

The left wing 103 projects away from the left 106 back 109 side of the tongue 102, and is bounded on the upper 110 side by the upper rim 118. As the left wing 103 projects away from the left 106 back 109 side of the tongue 102, the section of the upper rim 118 that bounds the left wing 103 continuously rises above the tongue 102. The left wing 103 is bounded by a left back rim 121 and a left lower rim 122.

The right wing 104 projects away from the right 107 back 109 side of the tongue 102, and is bounded on the upper 110 side via the upper rim 118. As the right wing 104 projects away from the left 106 back 109 side of the tongue 102, the section of the upper rim 118 that bounds the right wing 104 continuously rises above the tongue 102. The right wing 104 is bounded by a right back rim 123 and a right lower rim 124.

The base 101, the tongue 102, the left wing 103 and the right wing 104 are formed as a single unit. Plastics including, but not limited to, polycarbonate or polyethylene may be used. Metals including but not limited to, aluminum may also be used. The material and mold selected to produce the base 101, the tongue 102, the left wing 103 and the right wing 104 has enough elasticity to allow the span between the left wing 103 and the right wing 104 to be increased by pulling the left wing 103 and the right wing 104 apart. This makes attaching the base 101, the tongue 102, the left wing 103 and the right wing 104 to the motorcycle helmet 116 easier.

The base 101, the tongue 102, the left wing 103 and the right wing 104 are attached to the motorcycle helmet 116 without requiring modifications to the motorcycle helmet 116. This is accomplished using the plurality of adhesives 105. The plurality of adhesives 105 comprises a base adhesive 112, a left adhesive 113, and a right adhesive 114. The base adhesive 112 is an area located on the upper 110 surface of the base 101 upon which a glue or adhesive has been applied. The left adhesive 113 is an area located on the inner surface 120 of the left wing 103 upon which a glue or adhesive has been applied. The right adhesive 114 is an area located on the inner surface 120 of the right wing 104 upon which a glue or adhesive has been applied. The left adhesive 113 is adaptively used to join the left wing 103 to the left 106 side of the chin bar 125 of the motorcycle helmet 116. The right adhesive 114 is adaptively used to join the right wing 114 to the right 107 side of the chin bar 125 of the motorcycle helmet 116.

The base 101 is adapted to receive a camera mount 126, which is held in place by the base adhesive 112. Using a camera mount 126 instead of mounting the camera 115 directly on the base 101 serves two purposes. The first purpose is that camera mounts 126 are designed to allow the camera 115 position to be rotated or otherwise adjusted during use. Second, using a camera mount 126 prevents the base adhesive 112 from damaging the camera 115.

A broad range of suitable adhesives can be used as the glue or adhesive for the base adhesive 112, the left adhesive 113, and the right adhesive 114. For permanent attachment of the invention 100 to the motorcycle helmet 116 a structural glue including, but not limited to, urethane based adhesives, cyanoacrylates based adhesives, or epoxy can be used. Alternatively, for temporary attachments pressure sensitive adhesives including, but not limited to, acrylic based adhesives, natural or silicone rubber based adhesives, or styrene block copolymers can be used.

As shown in FIG. 1 of the first potential embodiment of the disclosure, a pressure sensitive adhesive was used for the base adhesive 112, the left adhesive 113, and the right adhesive 114. The base adhesive 112, the left adhesive 113, and the right adhesive 114 are protected by paper 127 that is peeled off the left adhesive 113 and the right adhesive 114 before the invention 100 is applied to the motorcycle helmet 116. The paper 127 is peeled off the base adhesive 112 before the camera mount is place on the base 101.

To use the invention 100, the inner surface 120 of the left wing 103 is attached to the left 106 side of the chin bar 125 using a suitable glue or adhesive. The inner surface 120 of the right wing 104 is attached to the right side 107 of the chin bar 125 using a suitable glue or adhesive. A camera mount 126 is attached to the upper 110 surface of the base 101 using an appropriate glue or adhesive. The camera 115 is then placed on the camera mount 126.

The directional references used in this disclosure correspond to the directional references from the perspective of the user 117 wearing the motorcycle helmet 116. For example, the left wing 103 is mounted on the left 106 side of the motorcycle helmet 116. This means that the left wing 103 is mounted on the side of the motorcycle helmet 116 that is towards the left 106 side of the user 117 wearing the motorcycle helmet 116. The directional names are left 106 side, front 108 side, right 107 side, back 109 side. Upper 110 and above refer to the direction towards the head. Lower 111 refer to the direction towards the feet. The inner surface 120 is the surface closest to the motorcycle helmet 116. The outer surface 119 is the surface that is distal from motorcycle helmet 116.

The following definition is used in this disclosure:

Motorcycle Helmet: As used in this disclosure, a motorcycle helmet is a piece of protective headgear that provides a chin bar 125 to provide chin and lower face protection during an impact. Motorcycle helmets are worn to protect the users head during impacts. This definition is intended to explicitly include helmets beyond those worn by motorcycle riders including, but not limited to, helmets worn by alpine ski racers or race car drivers. This definition is intended to explicitly exclude "motorcycle" helmets without a chin bar such as "open face," "¾," or "half" helmets.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A motorcycle helmet mount comprising:
  a base, a tongue, a left wing, a right wing, and a plurality of adhesives;

wherein the motorcycle helmet mount is adapted to mount on a chin bar of a motorcycle helmet;
wherein the motorcycle helmet mount is adapted to mount on the chin bar of the motorcycle helmet without requiring modification to the motorcycle helmet;
wherein the base is positioned in front of the motorcycle helmet;
wherein the motorcycle helmet mount is adapted for use with a camera;
wherein the motorcycle helmet mount adaptively holds the camera in front of the helmet;
wherein
the base, the tongue, the left wing, and the right wing are formed as a single unit;
wherein the base is further defined with an upper surface and a lower surface;
wherein the tongue is further defined with a left side and a right side;
wherein the left wing is further defined with an inner surface and an outer surface;
wherein the right wing is further defined with an inner surface and an outer surface;
wherein the base is flat plate;
wherein the tongue projects out from the back of the base;
wherein the tongue is a curved structure with a convex upper surface;
wherein as the tongue projects away from the back of the base the span from the left side of the tongue to the right side of the tongue increases;
wherein the convex upper surface of the tongue rises above the upper surface of the base;
wherein the tongue is further bounded by an upper rim;
wherein the left wing projects away from the left side of the tongue and the back side of the tongue;
wherein the left wing is bounded on the upper side by the upper rim;
wherein as the left wing projects away from the left back side of the tongue the section of the upper rim that bounds the left wing continuously rises above the tongue;
wherein the left wing is bounded by a left back rim and a left lower rim.

2. The motorcycle helmet mount according to claim 1 wherein the right wing projects away from the right side of the tongue and the back side of the tongue;
wherein the right wing is bounded on the upper side by the upper rim;
wherein as the right wing projects away from the right back side of the tongue the section of the upper rim that bounds the right wing continuously rises above the tongue;
wherein the right wing is bounded by a right back rim and a right lower rim.

3. The motorcycle helmet mount according to claim 2 wherein the motorcycle helmet mount has elasticity to enable the span between the left wing and the right wing to be increased by pulling the left wing and the right wing apart.

4. The motorcycle helmet mount according to claim 3 wherein the plurality of adhesives comprises a base adhesive, a left adhesive, and a right adhesive.

5. The motorcycle helmet mount according to claim 4 wherein
the base adhesive is located on the upper surface of the base;
the left adhesive is located on the inner surface of the left wing;
wherein the right adhesive is located on the inner surface of the right wing.

6. The motorcycle helmet mount according to claim 5 wherein
the left adhesive is adaptively used to join the left wing to the chin bar of the motorcycle helmet;
wherein the right adhesive is adaptively used to join the right wing to the chin bar of the motorcycle helmet.

7. The motorcycle helmet mount according to claim 6 wherein the base is adapted to receive a camera mount;
wherein the camera mount is held in place by the base adhesive.

8. The motorcycle helmet mount according to claim 1 wherein a base adhesive is located on an upper surface of the base;
wherein a left adhesive is located on an inner surface of the left wing;
wherein a right adhesive is located on an inner surface of the right wing.

9. The motorcycle helmet mount according to claim 8 wherein the left adhesive is adaptively used to join the left wing to the chin bar of the motorcycle helmet;
wherein the right adhesive is adaptively used to join the right wing to the chin bar of the motorcycle helmet.

10. The motorcycle helmet mount according to claim 9 wherein the base is adapted to receive a camera mount;
wherein the camera mount is held in place by the base adhesive.

* * * * *